April 27, 1937.  D. COLLINS  2,078,600
CLUTCH
Filed Dec. 11, 1933  2 Sheets-Sheet 1
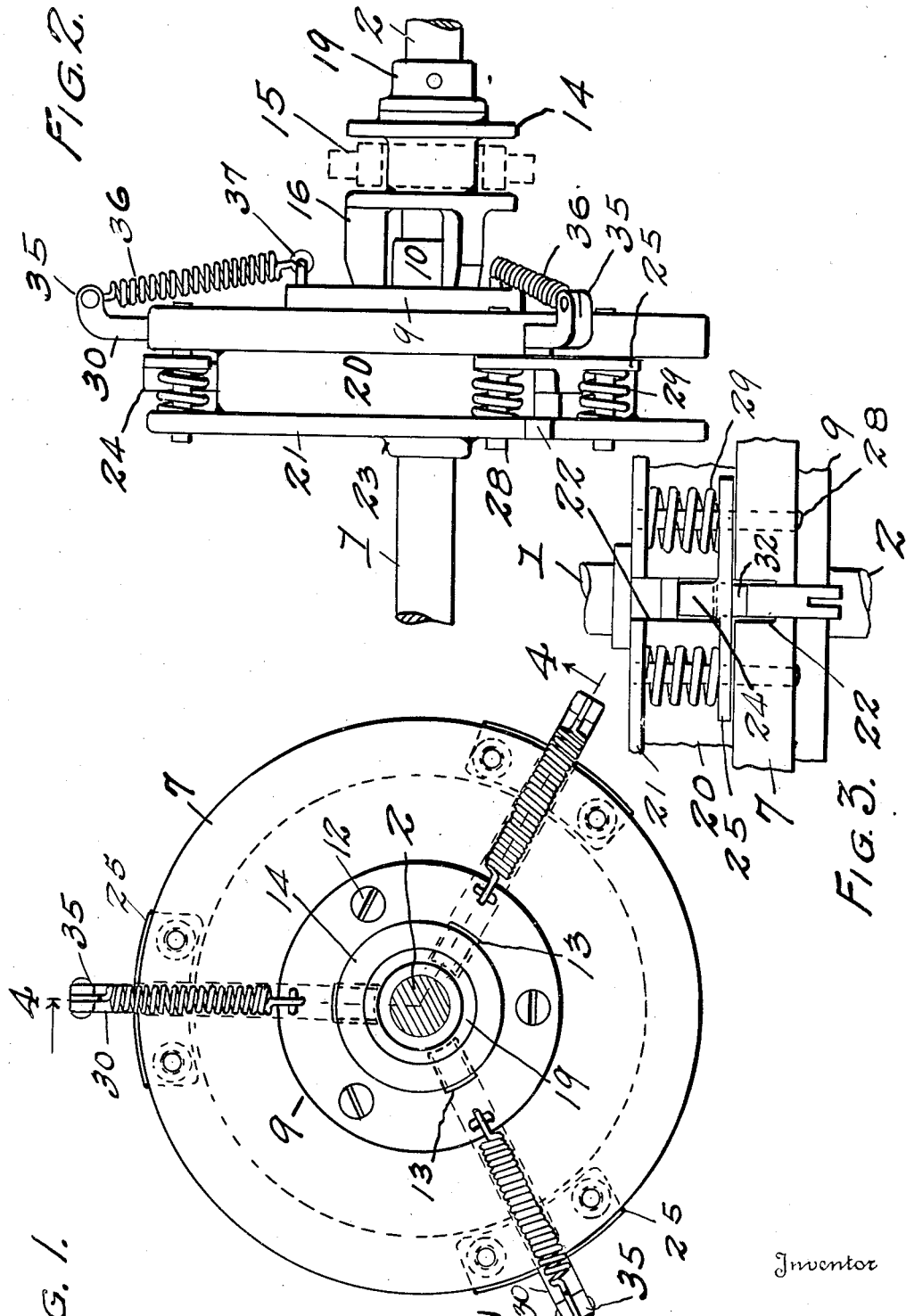
Inventor
DOUGLAS COLLINS
By Chas K. Davis
Attorney April 27, 1937. D. COLLINS 2,078,600
CLUTCH
Filed Dec. 11, 1933 2 Sheets-Sheet 2
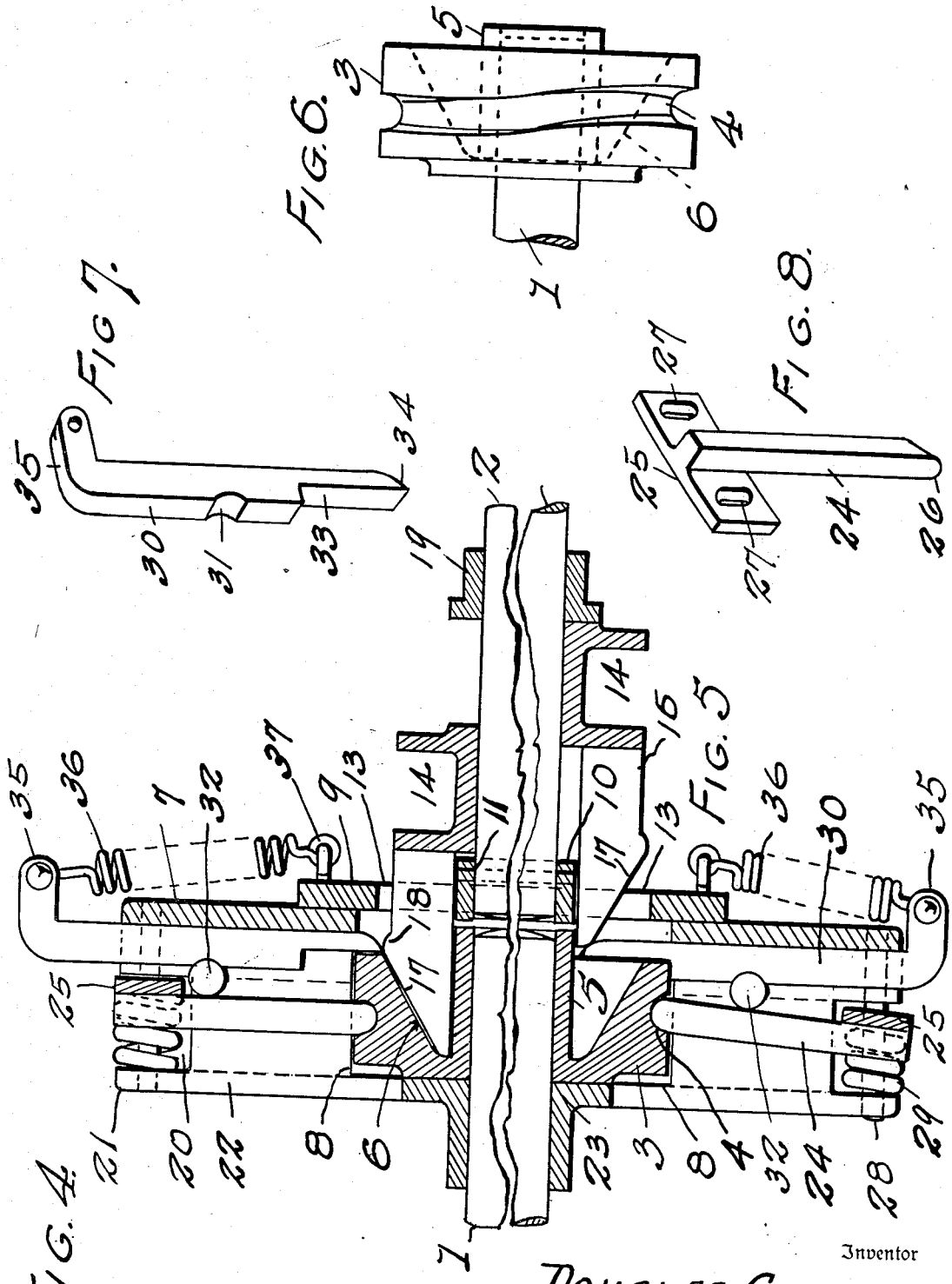
Inventor
DOUGLAS COLLINS
By Chas K. Davis
Attorney Patented Apr. 27, 1937

2,078,600

UNITED STATES PATENT OFFICE 2,078,600

CLUTCH

Douglas Collins, Salisbury, N. C.

Application December 11, 1933, Serial No. 701,894

14 Claims. (Cl. 192—52)

The present invention relates to improvements in clutches or power transmission devices, of the anti-friction resilient type employing torque for transmitting power through complementary driving and driven members from a driving shaft to a driven shaft.

In carrying out my invention I employ a number of resilient torque units, or clutching elements, by means of which the driving member and the driven member are clutched together or engaged for the transmission of power. Each of the torque units or clutching elements is alternately rendered active and inactive during one revolution of a torque head or driving member, and in this manner a succession of clutching effects is attained during each revolution of the torque head or driving member, for the purpose of imparting power to the driven member. The frequency of these impulses or clutching effects is governed by the number of torque units employed, and by the speed of revolution of the driving member, and while I have illustrated the use of three torque-units in the accompanying drawings, it will be understood that the number may be increased or decreased, within certain limits for the purpose of adapting my invention to different conditions and different ends.

Each torque unit includes a torque-lever located between the driving member and the driven member of the clutch, and resilient means are provided on the driven member to resist the lever-action of each unit, thereby causing the clutching effect that transmits power from the driving member to the driven member. The torque-units are automatically rendered active for transmission of power.

By the utilization of the torque-units I provide a clutch which is capable of creating a torque in gradually increasing or decreasing degrees within a wide range, i. e. from inactive position of the clutch-elements to active position of the elements whereby a full torque delivery is attained from the driving member to the driven member. By the use of resilient resistance members in the torque-units, the transmission of shocks is prevented and such shocks and vibrations are absorbed by the action of the resilient resistance members. The use of the resilient resistance members in the torque-units also neutralizes the results of an overload that may be imposed on the clutch. Thus, for instance, in the initial rotation of the driven shaft, if the inertia is excessive, the torque-units provide slippage between the driving member and the driven member, which slippage is gradually decreased as the inertia is gradually overcome by the successive clutching effects of the torque-units, until the full torque-power is transmitted smoothly and efficiently from the driving shaft to the driven shaft.

By proper placing of the fulcrum lever the resilient resistance in the torque-units is adjusted with relation to the load of the driven shaft, so that the lever action of the torque-units may be substituted for reducing gears, thereby providing a speed reducing mechanism that may be employed under certain conditions.

My invention consists in certain novel combinations and arrangement of parts as will hereinafter be more fully set forth. In the accompanying drawings I have illustrated one complete example of the physical embodiment of my invention wherein the parts are combined and arranged according to one mode I have thus far devised for the practical application of the principles of my invention. As many changes can be made in the exemplified construction, and as many apparently widely different embodiments of the invention can be made without departing from the scope of the invention, it is intended that all matter contained in the following description and illustrated in the accompanying drawings shall be illustrative, and not interpreted in a limiting sense.

It is also to be understood that the language used in the appended claims is intended to cover all generic and specific features of the invention.

Figure 1 is a side view of a clutch embodying my invention, showing the driven shaft in section, and indicating the clutch members as disengaged.

Figure 2 is an edge view of the clutch, as seen from the left in Figure 1, and indicating by dotted lines a conventional pivoted shifting fork for the clutch.

Figure 3 is an enlarged detail view at the edge of the clutch, showing the arrangement of one of the torque-units.

Figure 4 is an enlarged, transverse sectional view of the clutch showing one torque-unit in inactive position; and Figure 5 is a similar view showing one torque unit in active position; both sectional views being taken on line 4—4 of Figure 1.

Figure 6 is a plan view of the rotary driving torque-head.

Figure 7 is a perspective view of one of the three fulcrum-holders or cam slides.

Figure 8 is a perspective view of one of three torque-levers employed in the torque-units.

In the drawings I have illustrated two axially alined shafts 1 and 2, the former being the drive shaft, and the latter the driven shaft, and the driving shaft is provided with a driving member or torque head 3 keyed to the shaft or otherwise secured thereon. The driving member or torquehead, which is hollow and provided with a cylindrical exterior periphery, is fashioned with an annular, continuous, spiral or helical torquegroove 4, making one complete revolution about the member. The torque-groove forms an endless, concave, screw-thread about the periphery of the driving member, and the pitch of the thread may be varied in different mechanisms for actuating a torque-unit under various conditions. Thus a wider pitch or greater pitch than that illustrated in the drawings will increase the lever action of the torque units, while a narrower pitch than that illustrated will produce a lesser degree of lever action in the torque units.

Within the hollow torque-head, as best seen in Figures 4, 5, 6, is fashioned an attaching sleeve 5, by means of which the driving member is keyed to the driving shaft, and surrounding this sleeve I provide a conical recess 6 which has its flared, circular opening in the face of the torque head which is adjacent the driven shaft 2. This conical recess or concavity extends a substantial distance into the torque head or driving member, but terminates a suitable distance from the driving side of the driving member to insure strength for its purpose.

The driving member or torque-head is enclosed within a hollow circular disk or driven head 7 which is provided with a central circular or cylindrical recess 8 to accommodate the driving member, and the driven member is open at one side to permit insertion of the driving member into its recess. When the clutch is disengaged, the driving member is of course free to revolve within the driven member or hollow head 7.

A circular cover plate 9, which is fashioned with a central sleeve or bushing 10 is fastened, rigidly, to the driven shaft by means of a transverse pin 11 extending through the sleeve and the shaft, or other suitable means may be employed for rigidly fastening the plate to the shaft, and the cover plate is rigidly fastened to a face of the driven member by means of screws as 12. Thus it will be apparent that the driven shaft 2, cover plate 9 and the driven member 7 are rigidly fastened together for rotation.

As indicated in Figures 1 and 4, the cover plate is fashioned with three equidistant, radially extending slots or openings 13 which extend outwardly from the bushing 10, and terminate at a suitable distance therefrom.

For releasing, or permitting disengagement of the clutch, I provide suitable means, as a conventional spool 14 mounted to slide on the driven shaft 2, and this spool may be reciprocated on the shaft through the action of the clutch-fork 15 indicated in Figure 2 by dotted lines. The clutch fork may be controlled by manually operated means, pedal operated means, or any other suitable means for the purpose required.

The slide spool is fashioned with three circumferentially spaced shanks or blades 16 that extend toward the clutch in planes parallel with the alined shafts, and these shanks are adapted to pass through the slots of the cover plate into and out of the conical recess of the driving member or torque-head. The inner ends or the free ends of the blades are provided with cam edges 17 that terminate in lobes as 18 which project slightly beyond the outer edges of the blades. The outward sliding movement of the clutch spool may be limited by suitable means on the shaft 2, as for instance the fixed collar 19, and the inward movement of the cam blades is limited by the conical wall of the recess 6 in the driving member or torque head.

As best seen in Figures 1 and 2, the exterior periphery of the driven member or disk is fashioned with a comparatively wide annular groove 20 which forms an annular face flange 21 at one side of the disk, and the driving side of the disk is fashioned with three equidistant radially extending slots 22 that extend outwardly from the hub portion 23 of the driven member, which hub portion is loosely mounted on the driving shaft 1. These slots extend outwardly through the annular flange 21, and they extend transversely, or inwardly into the body of the disk, across the annular groove 20, and they terminate short of the driven side of the driven member. At their inner ends, within the hub portion 23, these radial slots open into the annular recess 8 of the driven member 7.

Within each of the three radial slots 22 is mounted a torque lever 24 having at its outer end a cross head 25, and at its inner end a rounded portion 26, and these inner ends of the radially extending torque-levers project into the endless spiral or screw-groove 4 of the torque-head or driving member. At opposite sides of the levers each cross head is fashioned with a pair of holes as 27, by means of which the three levers are supported on three pairs of pins 28 that are rigidly mounted in the disk 7 and its flange 21, and these pins extend transversely across or through the groove 20 of the driven member. A spring 29 is coiled about each pin and the springs are interposed between the inner face of the flange 21 and the ajoining faces of the several cross heads of the levers. The tendency of the springs is to force the outer ends of the levers away from the flange 21 of the driven member, and to offer a resilient resistance to the outer arms of the levers when the levers, or their outer arms, are pushed toward the springs against the tension of the springs. The tension of the springs may be varied to vary the resilient resistance to the action of the torque-levers, or the size of the springs may be varied, depending upon the desired strength or power of the clutch, in its transmission of motion.

It will be apparent from an inspection of the drawings that the cross heads extend laterally from the slots 22 into groove 20 and that the torque levers are confined in the radial slots with their inner ends engaged at all times in the helical, endless groove 4 of the driving member, but these levers are adapted to oscillate or rock transversely of the driven member in which they are mounted.

As seen in Figures 4, 5, and 7, each torque lever has a complementary fulcrum-holder or slidable bearing member 30 in the form of a bar that is rectangular in cross section, which is located in the radial slot 22 in contact with the walls of the slot, which walls guide this fulcrum holder in its radially reciprocating movement. Each of these slide bars or fulcrum holders has an arcuate bearing face 31 in its edge that adjoins a complementary lever, and a movable fulcrum-roller 32 is retained at all times in its arcuate bearing and in rolling contact with the adjoining edge of a lever, which edge, as shown is smooth and provides a track for rolling contact of this fulcrum-roller. The inner ends of the fulcrum-holders are cut away at 33 in order that these ends may project across the face of the driving head, and these cut-away ends terminate in cams 34, for co-action with the cams 17 of the blades 16.

On the outer ends of the slidable fulcrum-holders 30 angular heads 35 are fashioned, and they project over one side of the driven member for convenient attachment of the outer ends of springs 36 that are anchored at their inner ends at 37 to the cover plate of the driven member.

These springs tend at all times to pull the fulcrum-holders and their fulcrum-rollers inwardly toward the center of the clutch and the fulcrum holders are forced outwardly against the tension of their springs, as in Figure 4, when the cam blades are slid into the recess of the driving member for the purpose of disengaging the clutch. When the clutch is disengaged, the inner rounded ends of the fulcrum-holders rest upon the lobes 18 of the cam blades, and the springs 36, under tension, hold these fulcrum-holders or slides in this position.

When the spool 14 is moved to the right in Figure 4 to the active position of Figure 5, the springs under tension in Figure 4 immediately pull inwardly the fulcrum holders and their fulcrum rollers, and the holders and rollers eventually take the position of Figure 5 where it will be seen that the fulcrums 32 are nearer the shafts than are the fulcrums represented at 32 in Figure 4. Thus, when the fulcrum holders and the fulcrums are at the maximum distance from the shafts, and so held by the cam blades, the driving member or torque head 3 is free to revolve within the driven member and around the cam blades 16, and the driven member and its connected parts, remain stationary. Under these conditions when the clutch is disengaged, the rotating torque-head, through its endless screw-groove or torque groove, oscillates or rocks the levers 24 on their fulcrums, against the tension of the springs 29, but the comparatively slight movement of the outer or shorter arm of each lever as it is rocked or oscillated is not sufficiently effective to produce the required torque for engaging the clutch. Therefore the driving member rotates, and the levers oscillate without transmitting power from the driving member to the driven member.

When the cam blades are withdrawn from the clutch, as in Figure 5, the springs 36 pull the fulcrum holders and the fulcrums inwardly toward the shafts, and the outer arm of each lever now becomes the longer arm, the shorter arm, as before described, having its end projecting into the screew groove or torque groove.

As indicated in Figures 4 and 5, and in Figure 6 the pitch, or helical arrangement of the endless torque groove in the periphery of the driving member, may cause an oscillating movement of the levers regardless of whether the clutch is engaged or disengaged, but by moving the fulcrums of the levers from their maximum distance to their minimum distance, with relation to the driving shaft or the driving member, the levers become active in creating torque between the driving member and the driven member and the latter therefore is rotated with the driving member.

In the active position of the lever in Figure 5, for normal driving purposes, the lever is held rigidly in is position inclined to the axis of the shaft 1, by its connection with the spiral groove 4 at one end, by its pressure against the compressed springs 29 at its outer end, and by the fulcrum 32, which, as shown is located nearer the inner end of the lever than its outer end, and the created torque between the driving member and the driven member transmits motion to the driven member.

The lever in Figure 5 is at one extreme of its oscillation, the other extreme being in a position parallel with its complementary fulcrum holder, which is at all times perpendicular to the shafts, and the other two levers, because of the pitch of the endless torque groove 4 may or may not oscillate. In overcoming inertia of the driven shaft, the rotation of the driving member causes a succession of impulses from the driving member to the driven member, and the levers are oscillated by the driving member, due to the fact that the speed of the driving shaft is greater than that of the driven shaft. Thus the torque is successively applied by the torque units, and the clutch is gradually "inched" along with a gradual increase in torque, until the driven shaft reaches the speed of rotation of the driving shaft, and thereafter, with the driving member and the driven member revolving at the same speed, one of the torque-units may be delivering its full or maximum torque to the driven member, while the other two units are delivering a lesser torque to the driven member.

It will be understood that the resiliency of the springs provides a flexible resistance against the pressure of the long arm of the torque lever, and as before stated the tension of the springs 29 may be varied, or the size and strength of the springs employed to resist the leverage of the long arm of the lever may be varied in different mechanisms.

After the driven shaft reaches the same speed of revolution as the driving shaft, the power is smoothly and efficiently transmitted from the driving member to the driven member, and the driven shaft revolves with a uniform and constant speed.

From the above description taken in connection with my drawings it will be apparent that I have devised a novel and useful construction of clutch or power transmitting device, which embodies many advantageous features in addition to those enumerated, and while I have in the present instance, shown and described an operative embodiment of the invention, it will be understood that the invention is susceptible of modification in various particulars in adapting the invention for different purposes, without departing from the spirit or scope of the invention, and without sacrificing any of its advantages.

Having thus fully described my invention, what I claim as new and desire to secure by Letters Patent is:—

1. The combination in a clutch with a driving member and an actuating member thereon and a driven member, of an oscillatable torque-lever operatively mounted between said members and in constant operative engagement with said actuating member, means for changing the location of the fulcrum for said lever, and means for offering a resilient resistance to the actuation of said lever.

2. In a clutch, the combination with a recessed driven member and a driving member enclosed therein, of a plurality of radially extending torque-levers mounted in the driven member, and said driving member having an annular, endless, helical-thread for the reception of and co-action with the inner ends of said levers whereby torque is transmitted from the driving member through said levers to the driven member.

3. In a clutch, the combination with a recessed driven member and a driving member enclosed therein, of a plurality of torque-levers mounted in the driven member, means at one end of said levers to offer a resilient resistance thereto, and an endless, annular screw-groove in the periphery of the driving member confining the other ends of said levers, whereby torque is transmitted from the driving member through the levers to the driven member for clutching effects.

4. In a clutch, the combination with a recessed driven member and a driving member enclosed therein, of a plurality of torque levers mounted in the driven member, said torque-levers each having a fulcrum and means for varying the distance of said fulcrums with relation to the driving member, means at the outer ends of the levers to offer a resilient resistance thereto, and said driving member having an endless annular screw-groove confining the inner ends of said levers whereby a clutching effect is produced between said members.

5. In a clutch, the combination with a recessed driven member and a driving member enclosed therein, of a plurality of radially mounted torque levers in the driven member, a cross head on the outer end of each lever and springs interposed between said heads and the driven member, and an endless screw-groove in the periphery of the driving member confining the inner ends of the said levers.

6. In a clutch, the combination with a recessed driven member and a driving member enclosed therein, of a plurality of torque levers mounted in the driven member, a slidable fulcrum holder for each lever and resilient means limiting movement of said holders, fulcrum members in the holders supporting said levers, means for projecting said fulcrum holders, and co-acting means on the levers and driving member in constant operative engagement for oscillating the levers on their fulcrums.

7. In a clutch, the combination with a recessed driven member and a driving member enclosed therein, of a plurality of torque levers mounted in the driven member, cross heads on said levers and springs interposed between said cross heads and the driven member, a slidable fulcrum-holder and a fulcrum for each lever, a spring for limiting the outward movement of each holder, means for projecting the holders, and an endless screw-groove in the periphery of the driving member in constant operative engagement with the inner ends of the levers.

8. The combination, in a clutch with a drive shaft and an actuating member thereon, and a driven member, of a torque-lever operatively mounted between said members and in constant operative engagement with the actuating member whereby torque is transmitted from one member to the other member, and means for changing the location of the fulcrum of said lever.

9. In a clutch, the combination with a drive shaft and an annular cam thereon having a fixed throw, and a driven member, of a torque-transmitting unit between said cam and the driven member, said unit including an actuating lever in constant operative engagement with the cam.

10. In a clutch, the combination with a drive shaft and an annular cam thereon having a fixed throw, and a driven member, of a torque-transmitting unit between said cam and the driven member, said unit including an actuating lever in constant operative engagement with the cam and means offering a resilient resistance against the action of the lever.

11. In a clutch, the combination with a drive shaft and an annular cam thereon having a fixed throw, and a driven member, of a torque-transmitting unit between said cam and driven member, said unit including an actuating lever in constant operative engagement with the said cam, and a movable fulcrum for said lever adapted to control its oscillations.

12. In a clutch, the combination with a drive shaft and an annular cam thereon, and a driven member, of a torque transmitting unit including a resilient member between said cam and the driven member, said unit including an actuating lever in constant operative engagement with the cam, a movable fulcrum for said lever, and means for moving said fulcrum for varying the range of oscillations of the lever to transmit a varying degree of pressure against said resilient member.

13. In a clutch, the combination with a drive shaft and a cam thereon, and a driven member, of a torque-transmitting unit between the cam and the driven member, said unit including a resilient resistance device, an actuating lever in constant operative engagement with the cam, a movable fulcrum for the lever, and means for moving said fulcrum for varying the range of oscillations of the lever to transmit a varying degree of pressure against the resilient resistance device.

14. In a clutch, the combination with a driving member and a driven member, of a torque-unit capable of transmitting power from the driving member to the driven member, said unit including an eccentric of constant throw, a torque lever in constant operative relation to the eccentric, means affording a resilient resistance to said lever, and means for moving the fulcrum of said lever to vary the degree of torque between said members.

DOUGLAS COLLINS.